United States Patent
Ito et al.

(10) Patent No.: US 11,148,635 B2
(45) Date of Patent: Oct. 19, 2021

(54) SEATBELT DEVICE

(71) Applicant: Autoliv Development AB, Vargarda (SE)

(72) Inventors: Katsuhiro Ito, Kanagawa (JP); Masuo Matsuki, Kanagawa (JP); Ganta Hibata, Kanagawa (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 16/966,509

(22) PCT Filed: Jan. 23, 2019

(86) PCT No.: PCT/JP2019/002131
§ 371 (c)(1),
(2) Date: Jul. 31, 2020

(87) PCT Pub. No.: WO2019/151087
PCT Pub. Date: Aug. 8, 2019

(65) Prior Publication Data
US 2020/0361411 A1    Nov. 19, 2020

(30) Foreign Application Priority Data
Feb. 2, 2018 (JP) .............................. JP2018-017716

(51) Int. Cl.
*B60R 22/26* (2006.01)
*B60R 22/40* (2006.01)
*B60R 22/48* (2006.01)

(52) U.S. Cl.
CPC .............. *B60R 22/40* (2013.01); *B60R 22/26* (2013.01); *B60R 22/48* (2013.01);
(Continued)

(58) Field of Classification Search
CPC ...... B60R 22/40; B60R 2022/401–403; B60R 22/26
See application file for complete search history.

(56) References Cited

U.S. PATENT DOCUMENTS 6,015,164 A * 1/2000 Yano ....................... B60R 22/26
                                                        242/384.4
6,068,340 A    5/2000 Yano et al.
(Continued)

FOREIGN PATENT DOCUMENTS

JP    H11-326362 A    11/1999
JP    2000-52921 A    2/2000
(Continued)

OTHER PUBLICATIONS

International Search Report of the International Searching Authority for PCT/JP2019/002131 dated Apr. 2, 2019.
(Continued)

*Primary Examiner* — Ruth Ilan
(74) *Attorney, Agent, or Firm* — Dickinson Wright PLLC

(57) ABSTRACT

An inclination controlling mechanism of a seatbelt device is provided with: a pulley that converts an advancing/retracting movement of a cable of the cable advancing/retracting mechanism; a drive gear mounted around a pivot shaft of the pulley and synchronized with rotation of the pulley; and a driven gear mounted around a pivot shaft of a sensor housing so as to move in conjunction with a rotation of the sensor housing. The drive gear and driven gear engage with each other in a condition where a rotational track surface of the drive gear and rotational track surface of the driven gear intersect at a predetermined angle. As a result, an inertial body supporting surface serving as a sensor reference plane can be accurately maintained horizontally even at an arbi- (Continued)

trary seatback recline angle, and thus the accuracy of the acceleration sensor can be improved.

15 Claims, 11 Drawing Sheets

(52) U.S. Cl.
CPC ... *B60R 2022/401* (2013.01); *B60R 2022/403* (2013.01); *B60R 2022/4808* (2013.01)

(56) References Cited

U.S. PATENT DOCUMENTS

| | | | | |
|---|---|---|---|---|
| 6,470,746 | B1* | 10/2002 | Murayama | B60R 22/40 297/480 |
| 9,079,563 | B2 | 7/2015 | Ito et al. | |
| 9,132,802 | B2 | 9/2015 | Ito et al. | |
| 9,174,607 | B2 | 11/2015 | Hata et al. | |
| 10,919,489 | B2* | 2/2021 | Shinya | B60R 22/48 |
| 2009/0033084 | A1 | 2/2009 | Sorensen et al. | |
| 2014/0306050 | A1 | 10/2014 | Ito et al. | |
| 2014/0306508 | A1 | 10/2014 | Ito et al. | |
| 2015/0001329 | A1 | 1/2015 | Matsuki et al. | |

FOREIGN PATENT DOCUMENTS

| | | |
|---|---|---|
| JP | 2000-79867 A | 3/2000 |
| JP | 2014-019365 A | 2/2014 |
| JP | 2014-234108 A | 12/2014 |
| WO | 2013/073568 A1 | 5/2013 |
| WO | 2013/105580 A1 | 7/2013 |

OTHER PUBLICATIONS

English translation of International Search Report of the International Searching Authority for PCT/JP2019/002131 dated Apr. 2, 2019.

* cited by examiner (a)

(b)

SEATBELT DEVICE

TECHNICAL FIELD

The present invention relates to a seatbelt device for protecting an occupant in a vehicle, and particularly relates to a seatbelt device where a seatbelt retractor is incorporated in a reclining type seatback.

BACKGROUND ART

A seatbelt device mounted to a vehicle is for restraining an occupant sitting in a seat by a seatbelt that has been pulled out from a seatbelt retractor in order to protect the occupant in a vehicle collision or the like. When an acceleration larger than a predetermined value is applied in a horizontal direction during a vehicle collision or the like, the seatbelt retractor detects the acceleration by an acceleration sensor, and activates a locking mechanism of the seatbelt, thereby disabling the seatbelt from being pulled out. Known examples of inertial bodies that are used in an acceleration sensor include those using a ball and those using a self-supported inertial body.

Incidentally, if the seatbelt retractor containing this type of acceleration sensor is provided in a seatback of a reclining type seat, inclination of the seatbelt retractor changes depending on a reclining angle (tilt angle) of the seatback. Therefore, acceleration cannot be properly detected in this condition. Therefore, there are seatbelt devices that are equipped with an acceleration sensor capable of appropriately detecting acceleration regardless of the reclining angle of the seatback (for example, refer to Patent References 1 to 3).

The seatbelt devices according to Patent References 1 to 3 have a cable advancing/retracting mechanism, which advances/retracts a cable by a length corresponding to a recline angle of a seatback, disposed in a portion connecting a reclining rotation shaft and seatback supporting arm protruding from a seat cushion. Furthermore, when the seatback reclines forward or backward, the seatbelt device controls a sensor reference line of the acceleration sensor to always face in a vertical direction by a cable suspended between the cable advancing/retracting mechanism and the seatbelt retractor, such that acceleration can be properly detected.

Furthermore, a mounting angle in a vehicle width direction (left-right direction of a vehicle) of the seatbelt retractor with regard to the seat back differs depending on the type of vehicle, vehicle seat specifications, and the like in order to ensure smooth withdrawal of the seatbelt. The seatbelt device according to Patent Reference 4 allows inclination of the acceleration sensor to be adjusted in a vertical direction in response to a change in a mounting angle in a vehicle width direction as well as in a front-back direction of the vehicle. In particular, Patent Reference 4 provides a pulley that converts an advancing/retracting movement of a cable of a cable advancing/retracting mechanism into rotational motion and an adjusting gear that rotates synchronously with a gear formed on a side portion of the pulley. Furthermore, the adjusting gear and a sensor housing are provided with a pin and slit for transmitting the rotation of the adjusting gear to the sensor housing.

Furthermore, when the inclination of the acceleration sensor is adjusted, a rotational track surface of the pulley and a rotational track surface of the sensor housing where an inertial body of the acceleration sensor is disposed are not parallel. Therefore, when rotation is transmitted to the sensor housing from the pulley through the adjusting gear, a rotation angle of the sensor housing deviates from a rotation angle of the pulley. Therefore, compensating means for compensating for the deviation of the rotation angle is provided between the cable advancing/retracting mechanism and inclination controlling mechanism. For example, the compensating means is achieved by forming a cable winding portion of the pulley to have a spline curve shape.

PRIOR TECHNOLOGY DOCUMENTS

Patent References

Patent Reference 1: Japanese Unexamined Patent Application Publication No. 2000-79867
Patent Reference 2: Japanese Unexamined Patent Application Publication No. JP 2000-52921
Patent Reference 3: Japanese Unexamined Patent Application Publication No. H11-326362
Patent Reference 4: WO 2013/073568

SUMMARY OF THE INVENTION

Problem to be Solved by the Invention

Incidentally, with the seatbelt device according to Patent Reference 4, the adjusting gear is rotatably supported by a spherical hole provided in a boss part of the sensor housing. Therefore, it is difficult to stabilize the inclination, and further improvement is still desired in order to control the inclination of the acceleration sensor In view of the foregoing, an object of the present invention is to provide a seatbelt device that can accurately keep a sensor reference plane horizontal even at an arbitrary seatback recline angle, and improve the accuracy of the acceleration sensor.

Means for Solving the Problem

An object of the present invention is achieved by the following configurations.
(1) A seatbelt device, including: a seatbelt retractor mounted on a seatback of a reclining type seat and that winds up a seatbelt when necessary; and
a cable advancing/retracting mechanism disposed on a coupling part of a seat back and seat cushion of the reclining type seat, and having a cable for detecting a recline angle when the seat back reclines in a front-back direction of the seat and transmitting the recline angle to the seatbelt retractor, the cable advancing or retracting in a length direction of the cable at a distance corresponding to the recline angle of the seat back;
wherein
the seatbelt retractor includes:
a retractor frame secured to the seatback, inclining in a left-right direction of the seat with regard to a straight line extending in a vertical direction through a center of the seatback in the left-right direction;
a spindle supported by the retractor frame for winding the seatbelt;
an acceleration sensor mounted on the retractor frame that detects acceleration in the front-back direction of the seat;
a locking mechanism that locks a pull-out operation of the seatbelt based on the acceleration in the front-back direction of the seat detected by the acceleration sensor; and
an inclination controlling mechanism that keeps a sensor reference plane of the acceleration sensor horizontal;
the acceleration sensor includes:

a sensor cover secured to the retractor frame;
an inertial body that moves in a front-back direction of the seat when an acceleration that is greater than a predetermined value acts in the front-back direction of the seat;
a sensor housing having a pivot shaft along the left-right direction of the seat,
that is maintained in the sensor cover, and having an inertial body supporting surface where the inertial body is mounted; and
an actuating member that actuates the locking mechanism to a locking side in conjunction with the inertial body moving in the front-back direction of the seat;
the inclination controlling mechanism includes:
a pulley that converts the advancing/retracting movement of the cable advancing/retracting mechanism into a rotational motion;
a drive gear provided around a rotation shaft of the pulley and synchronized with rotation of the pulley; and
a driven gear mounted around a pivot shaft of the seat housing so as to move in conjunction with the rotation of the sensor housing;
wherein
the pivot shaft of the pulley and pivot shaft of the sensor housing intersect at a predetermined angle such that the pivot shaft of the sensor housing is provided in a horizontal direction with regard to the left-right direction of the seat;
the inertial body supporting surface of the sensor housing is maintained in a horizontal condition by pivoting the seat of the sensor housing in the front-back direction even if the seatback is reclined in the front-back direction of the seat; and
the drive gear and driven gear engage with each other in a condition where a rotational track surface of the drive gear and rotational track surface of the driven gear intersect at the predetermined angle.
(2) The seatbelt device according to (1), wherein a cam member that advances/retracts the cable by a distance based on the recline angle of the seatback by winding or pulling the cable based on rotation is provided in the cable advancing/retracting mechanism,
cable winding parts of the pulley and cam member are circular or arc-shaped, and
when the winding radius of the cable of the cable winding part of the cam member is α times the cable winding radius of the cable winding part of the pulley,
the gear ratio between the drive gear and driven gear is α.
(3) The seatbelt device according to (1) or (2),
wherein the driven gear is fitted and secured in a non-circular portion provided on a boss part formed above the pivot shaft of the sensor housing, and
the pulley extends along the rotation shaft, and has a shaft part where the driven gear is mounted such that the drive gear engages at a position in the axial direction of the driven gear.
(4) The seatbelt device according to any one of (1) to (3), wherein
the sensor cover is separately provided from the inclination controlling mechanism,
the pivot shaft of the sensor housing is mounted in the horizontal direction with regard to the left-right direction of the seat, and
the sensor cover is formed such that the rotation shaft of the pulley and pivot shaft of the sensor housing intersect at a predetermined angle.

Note that "vertical" or "vertical direction" of the present invention refers to the direction when a floor direction and ceiling direction are viewed from a center of the vehicle.

Furthermore, "left-right or left-right direction" refers to directions corresponding to a left-hand direction and right-hand direction as viewed from an occupant sitting normally in a seat and facing forward. Furthermore, "front-back or front-back direction" refers to a forward-facing direction as "front" and rear-facing direction as "back", as viewed from an occupant sitting normally in the seat and facing forward.

Furthermore, "horizontal" or "horizontal direction" refers to the horizontal (horizontal direction) including a range where an effect of the present invention can be achieved when designing a product, or within manufacturing error, even if there is a slight deviation from horizontal.

Furthermore, "the recline angle of the seatback in the front-back direction of the seat" is set such that a detection range of the recline angle of the seatback can be detected from a condition where the seatback is raised to an extent where an occupant can sit to a condition where the seat back is reclined to a rearward side of the seat. However, an angle detecting portion can be set to detect an angle from a condition where the seatback is tilted forward to a condition where the seatback is reclined rearward, and the detection range of the recline angle of the seatback can be arbitrarily set based on a customer's request.

Furthermore, the following embodiments only describe inclining at ±15° in the left-right direction with regard to the straight line extending in the vertical direction for "inclination in a left-right direction of the seat with regard to a straight line extending in a vertical direction through a center of the seatback in the left-right direction". However, a setting is possible between 0° to ±45° in the left-right direction, so long as the design is rational.

Furthermore, the predetermined angle in "the rotation shaft of the pulley and pivot shaft of the sensor housing intersect at a predetermined angle" is determined such that the pivot shaft of the sensor housing is in the horizontal direction. Basically, the angle is determined by an inclination angle in the left-right direction of the seat when the retractor is mounted on the seatback. In other words, the predetermined angle is set based on the mounting angle of the retractor.

Effect of the Invention

With the seatbelt device of the present invention, an inclination controlling mechanism is provided with: a pulley that converts an advancing/retracting movement of a cable of the cable advancing/retracting mechanism; a drive gear mounted around a pivot shaft of the pulley and synchronized with a rotation of the pulley; and a driven gear mounted around a pivot shaft of a sensor housing so as to move in conjunction with a rotation of the sensor housing. The drive gear and driven gear engage with each other in a condition where a rotational track surface of the drive gear and rotational track surface of the driven gear intersect at a predetermined angle.

Therefore, when transmitting rotation at an angle based on a recline angle of the seatback from the pulley to the sensor housing, the drive gear and driven gear can engage without backlash in a condition intersecting with each other, even in a condition where the rotation shaft of the pulley and the pivot shaft of the sensor housing intersect at a predetermined angle. Therefore, an inertial body supporting surface serving as a sensor reference plane can be accurately maintained horizontally even at an arbitrary seatback recline angle, and thus the accuracy of the acceleration sensor can be improved.

EMBODIMENT OF THE INVENTION

An embodiment of the seatbelt device of the present invention is described in detail based on the diagrams below.

Figure 1:
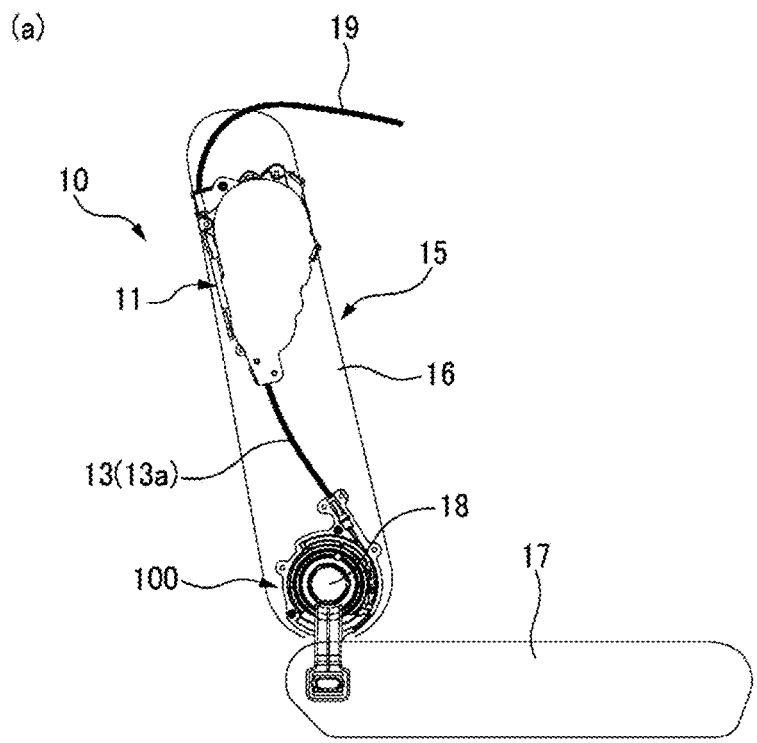
FIG. 1(a) is a side surface view of a reclining type seat provided with a seatbelt device according to the present invention, (b) is a back surface view of a left seat of the reclining type seat, and (c) is a back surface view of a right seat of the reclining type seat.
Figure 1:
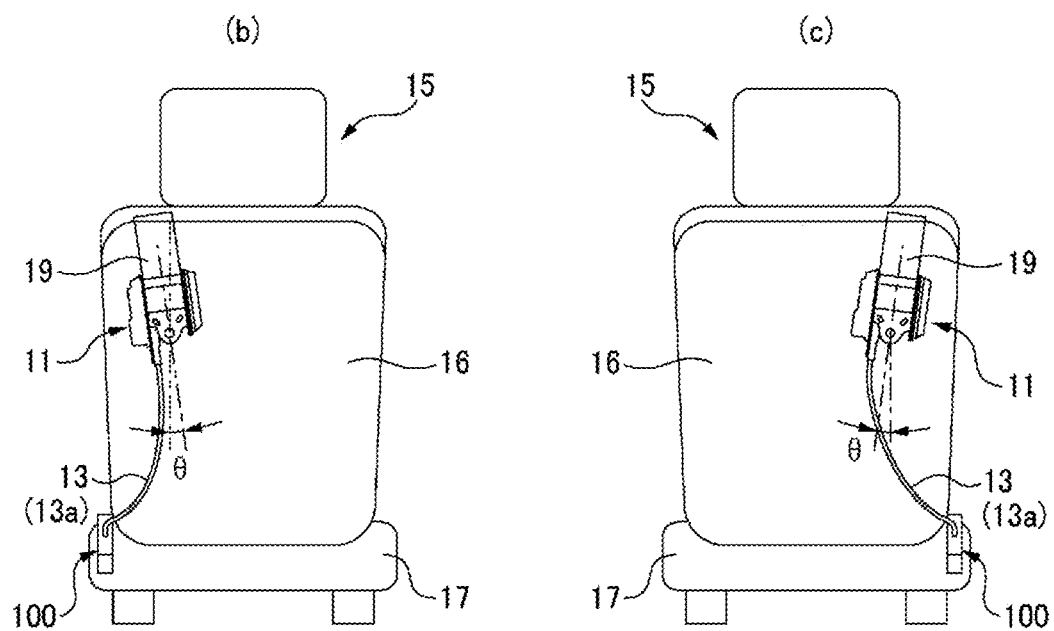

As illustrated in FIG. 1(a) to (c), the seatbelt device 10 of the present embodiment includes a seatbelt retractor 11 and a cable advancing/retracting mechanism 100. The seatbelt retractor 11 is mounted on a seatback 16 of a reclining type seat 15 and can wind up a seatbelt 19. The cable advancing/retracting mechanism 100 is provided on a joining part 18 that rotatably joins the seatback 16 and a seat cushion 17 of the reclining type seat 15. The cable advancing/retracting mechanism 100 transfers the reclining movement of the seatback 16 to the seatbelt retractor 11 through a cable 13a by advancing and retracting the cable (also called an inner cable) 13a by a length corresponding to the recline angle of the seatback 16. The seatbelt device 10 has a function of restraining an occupant in the reclining type seat 15 during a vehicle collision.

The cable (inner cable) 13a is covered by an exterior tube 13b (see FIG. 3) as described below to form a cable unit 13. Terminal members 13d on both ends of the exterior tube 13b are secured by a casing member 120 (see FIG. 7) of the seatbelt retractor 11 and the cable advancing/retracting mechanism 100 as described below. Thereby, the configuration is such that the cable 13a housed inside the exterior tube 13b can smoothly slide to advance or retract in an extending direction without creating any slack in the exterior tube 13b.

The seatbelt retractor 11 reclines at an arbitrary angle in the longitudinal direction of the vehicle (front/back direction of the seat 15) based on the reclining angle of the seatback 16. In addition, the seatbelt retractor 11 is mounted at a predetermined angle θ with regard to the lateral direction of the vehicle (left-right direction of the seat 15), depending on the vehicle model and seat specifications, such that the seatbelt 19 can be pulled out smoothly from the seatbelt retractor 11. Herein, the standard mounting inclination of the seatbelt retractor 11 is to be mounted on the seatback 16 at an incline of approximately 15° toward the back of the vehicle (reclined back 15°), in addition to an inclination angle at a predetermined angle θ (=15°) in the lateral direction of the vehicle. In other words, for the left seat, mounting is performed at an incline of the predetermined angle θ (=15°) to the left side when viewed from the rear, as illustrated in FIG. 1(b). For the right seat, mounting is performed at an incline of the predetermined angle θ (=15°) to the right side when viewed from the rear, as illustrated in FIG. 1(c).

Figure 2:
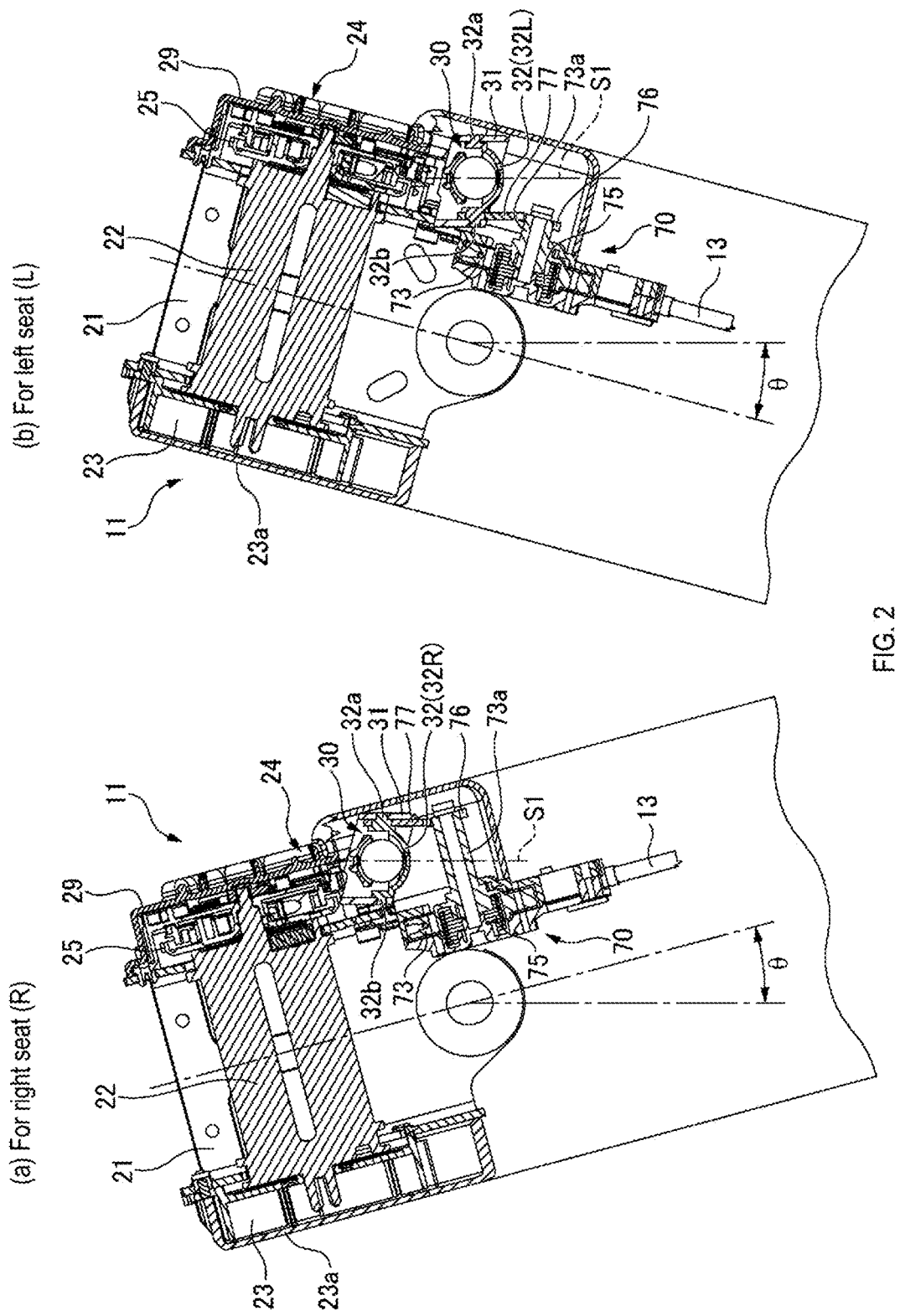
FIG. 2(a) is a cross-sectional view of a seatbelt retractor for the right seat mounted on a left side at a predetermined angle θ in the first embodiment of the present invention, as viewed from a front side of the seat, and (b) is a cross-sectional view of a seatbelt retractor for the left seat mounted on a right side at the predetermined angle θ.
Figure 3:
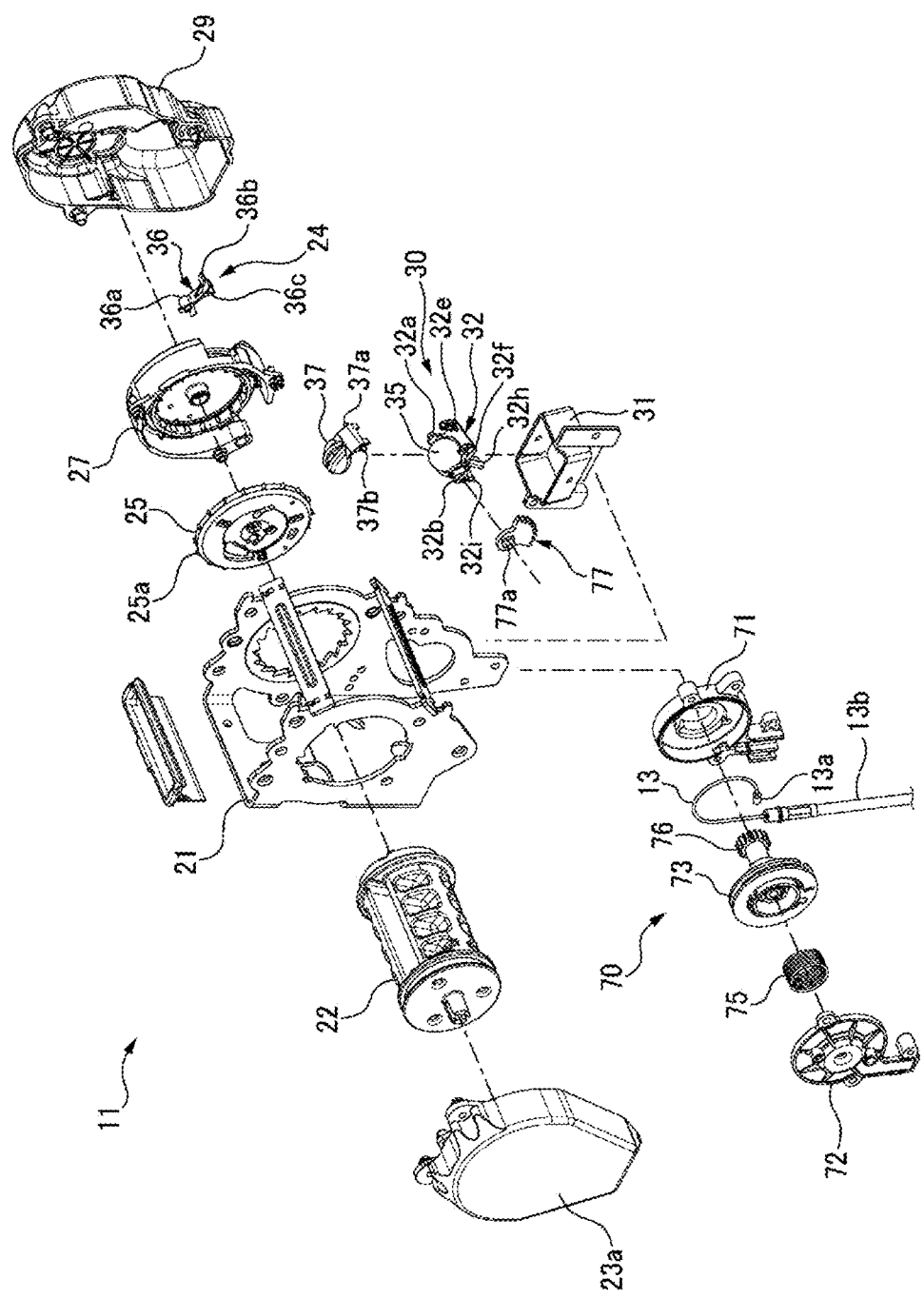
FIG. 3 is an exploded perspective view of the seatbelt retractor.

As illustrated in FIG. 2 and FIG. 3, the seatbelt retractor 11 includes a retractor frame 21 that is secured on the seatback 16 at an incline in the left-right direction of the vehicle with regard to a straight line extending in the vertical direction from the center in the left-right direction of the seatback 16. The retractor frame 21 rotatably supports a spindle 22 for winding up the seatbelt 19.

One end of the spindle 22 in the axial direction is joined to a retractor spring 23 which provides a rotational bias to the spindle 22 in the winding direction of the seatbelt 19. The retractor spring 23 is housed in a cover 23a.

The other end of the spindle 22 in the axial direction is provided with a steering wheel 25, which is one component of a locking mechanism 24 that locks the pull-out operation of the seatbelt 19, an acceleration sensor 30 that detects acceleration applied to the vehicle in the front-back direction and activates the locking mechanism 24 based on the detected acceleration, and an inclination controlling mechanism 70 which keeps the sensor reference plane (inertial body supporting surface 33 as described below) of the acceleration sensor 30 substantially horizontal, regardless of the recline angle of the seatback 16.

The steering wheel 25 is connected to the spindle 22 so as to integrally rotate, and in addition, has a plurality of engaging tabs 25a in a line at predetermined intervals in the circumferential direction of the outer circumferential surface to be connected with the upper tab parts 36b of an actuating member (first sensor lever 36) as described below, and is housed inside a steering wheel cover 27. Furthermore, the entire side surface of the other side of the seatbelt retractor 11 that contains the acceleration sensor 30 is covered by a retractor cover 29.

As illustrated in FIG. 3, the acceleration sensor 30 has a sensor cover 31, a sensor housing 32, a ball 35 made out of iron as an inertial body, and a second sensor lever 37 which functions as an actuating member. The sensor cover 31 is secured to the exterior surface of the retractor frame 21 so as to integrally recline with the seatback 16 in the front-back direction of the vehicle. The sensor housing 32 is pivotably supported in the front-back direction of the vehicle by the sensor cover 31 with a pivot shaft L1 (see FIG. 4) in the left-right direction of the vehicle as the center, and maintains the inertial body supporting surface 33, which is the sensor reference plane, in a substantially horizontal state in the front-back direction of the vehicle during reclining of the seatback 16 without being rotated in the front-back direction of the vehicle with regard to the sensor cover 31 by the inclination controlling mechanism 70. The ball 35 is supported above the inertial body supporting surface 33 of the sensor housing 32 and is displaced from a neutral position when acceleration in the front-back direction of the vehicle is applied at a predetermined value or higher. The second sensor lever 37 is linked when the ball 35 is displaced in the front-back direction of the vehicle and activates the locking mechanism 24 to the locked side.

Figure 4:
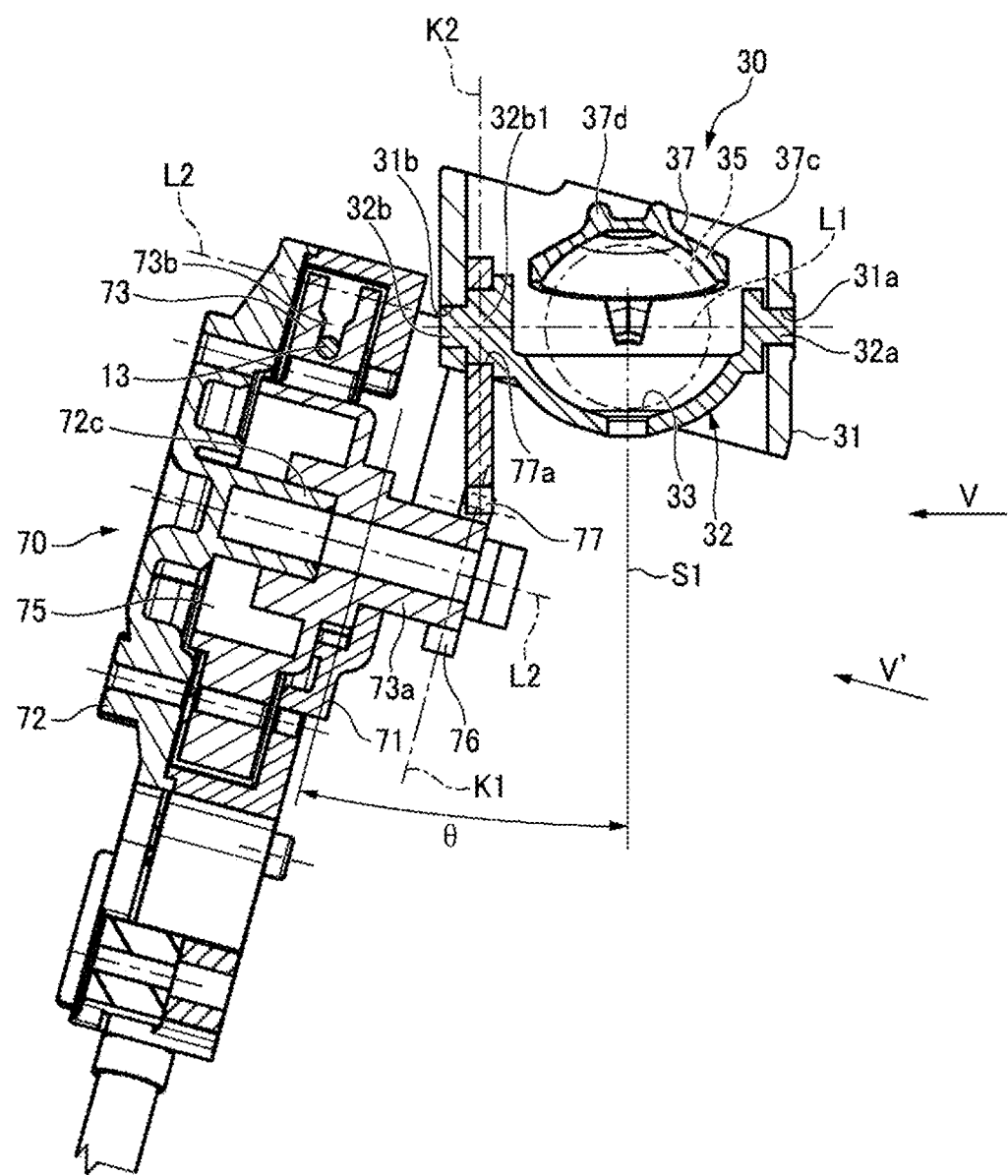
FIG. 4 is an enlarged cross-sectional view of essential parts of FIG. 2(b).
Figure 6:
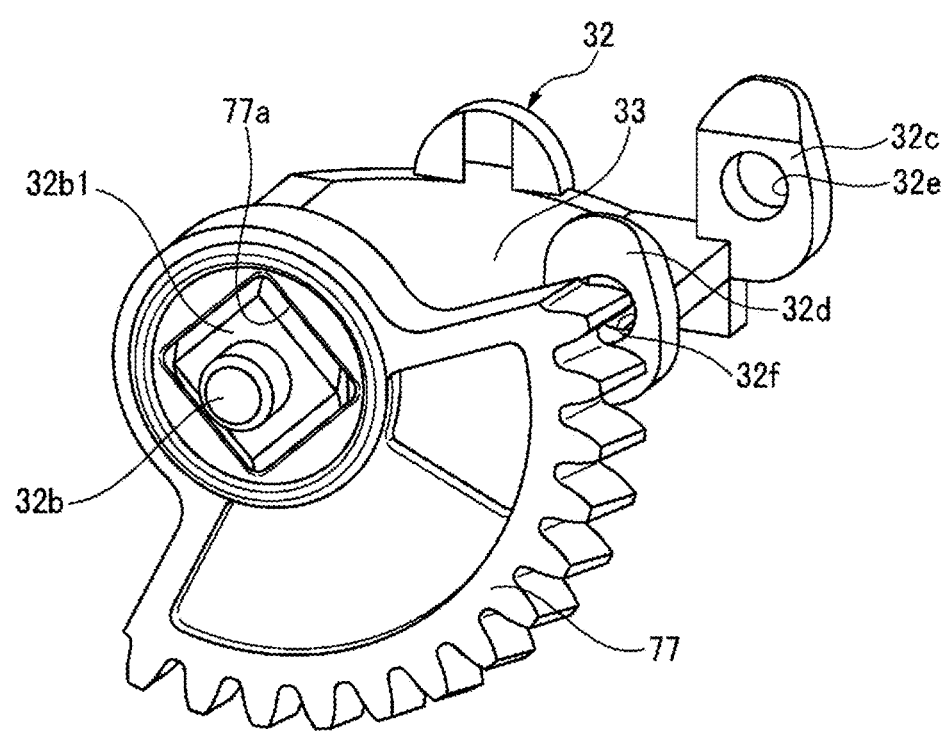
FIG. 6 is a perspective view illustrating engaging and securing of a driven gear and sensor housing.

More specifically, as illustrated in FIG. 4, the pivot shaft L1 is formed by mating a pair of supporting holes 31a and 31b of the sensor cover 31 to a pair of boss parts 32a and 32b that protrude from the exterior surface of the sensor housing 32, respectively. The sensor housing 32 can pivot in the front-back direction of the vehicle around this pivot shaft L1. In addition, as illustrated in FIG. 3 and FIG. 6, lever support holes 32e and 32f that are formed on a pair of brackets 32c and 32d of the sensor housing 32 mated with a pair of rotating protrusions 37a and 37b of the second sensor lever 37. The second sensor lever 37 is rotatably supported in the front-back direction of the vehicle to the sensor housing 32.

The sensor housing 32 is provided with the inertial body supporting surface 33 which is a mortar-shaped concave surface recessed downward on the inner underside surface of the top side. The ball 35 is placed on top of this inertial body supporting surface 33. The ball 35, which serves as an inertial body, is displaced from a neutral position and detects acceleration applied to the vehicle (or in other words, the seatbelt retractor 11) when acceleration in the front-back direction of the vehicle is received at a level over a predetermined amount. Note that the inertial body supporting surface 33 is in a substantially horizontal state refers to a condition where the reference plane of the inertial body supporting surface 33 (for example, the top surface of the inertial body supporting surface 33) is substantially horizontal.

As illustrated in FIG. 3, the first sensor lever 36 has a boss part 36a provided with mating holes on a base end part, and a tip end part which is formed into a substantially Y shape with an upper tab part 36b that abuts with the steering wheel 25 and a lower tab part 36c that abuts with the second sensor lever 37. The first sensor lever 36 is provided below the steering wheel 25 and the mating holes of the boss part 36a are mated with a supporting shaft (not illustrated) that is rotatably secured to the retractor frame 21. Furthermore, the upper tab part 36b is made to engage with an engaging tab 25a of the steering wheel 25 by rotating upward around the boss part 36a with mating holes, thus restricting the rotation of the steering wheel 25. Therefore, the locking mechanism 24 includes the steering wheel 25 and the first sensor lever 36.

As illustrated in FIG. 3, the second sensor lever 37 is provided with rotating protrusions 37a and 37b formed on the base end part, a bowl part 37c formed on the tip end side that covers the upper surface of the ball 35, and a rib 37d formed on the upper surface of the bowl part 37c. The rotating protrusions 37a and 37b are rotatably mated with the lever support holes 32e and 32f of the sensor housing 32. For the second sensor lever 37, the bowl part 37c is in contact with the upper side of the ball 35, and the lower tab part 36c of the first sensor lever 36 abuts with the upper surface of the rib 37d. Then, when the ball 35 is displaced from a neutral position by the acceleration, the first sensor lever 36 is pushed upward by the lower tab part 36c by rotating to the upper side, and the upper tab part 36b engages with the engaging tab 25a of the steering wheel 25, locking the steering wheel 25. Note that the first sensor lever 36 and the second sensor lever 37 are set such that the rotation shafts are opposite from each other when seen from the center of the ball 35, and rotation occurs in the opposite direction as when the ball 35 is displaced.

In addition, as illustrated in FIG. 3 and FIG. 4, the inclination controlling mechanism 70 that controls the inclination of the sensor housing 32 in the front-back direction is mounted on first and second pulley cases 71 and 72 that are provided on the inside of the side plate of the retractor frame 21, a pulley 73 that is housed in the inside space formed when the first and second pulley cases 71 and 72 are aligned, a torsion spring 75 which applies a rotational bias to the pulley 73, and a rotation shaft L2 of the pulley 73. Furthermore, the inclination controlling mechanism 70 is made up of a drive gear 76 that synchronizes with the rotation of the pulley 73 and a driven gear 77 mounted on the pivot shaft L1 of the sensor housing 32 to be linked with the rotation of the sensor housing 32.

The pulley 73 is rotatably supported by the first pulley case 71 and the second pulley case 72 around a supporting shaft 72c provided in the second pulley case 72. The pulley 73 converts the advancing/retracting movement of the cable (inner cable) 13a due to the cable advancing/retracting mechanism 100 to a rotating movement, by rotating at an angle corresponding to the advancing/retracting movement of the cable 13a in the same direction as the recline direction of the seatback 16. The pulley 73 is provided with a cable winding groove 73b on the outer circumferential surface for winding up the cable 13a and one end part (upper end part) of the cable 13a is secured to the pulley 73 through an end block 13c. Note that the cable 13a slidably passes through the inside of the exterior tube 13b, and the terminal member 13d mounted on one end of the exterior tube 13b is secured by the first pulley case 71 and the second pulley case 72.

The torsion spring 75 (see FIG. 3) applies a rotational bias to the pulley 73 in the winding direction of the cable 13a. In addition, the pulley 73 has a shaft part 73a that extends along the rotation shaft L2, and the drive gear 76 is mounted on the tip end part of the shaft part 73a. The length of the shaft part 73a is designed such that the drive gear 76 meshes in the axial direction position of the driven gear 77. As illustrated in FIG. 4 and FIG. 6, the driven gear 77 is secured to a non-round part 32b1 of the boss part 32b of the sensor housing 32 by mating with a concentrically formed non-round hole 77a. Note that with the present embodiment, the non-round part 32b1 and the non-round hole 77a are formed to be square.

In addition, the configuration is such that when making the cable winding radius of a cable winding groove 144 of a cam member 140 as described below α times the cable winding radius of the cable winding groove 73b of the pulley 73, the gear ratio of the drive gear 76 and the driven gear 77 is α.

Figure 5:
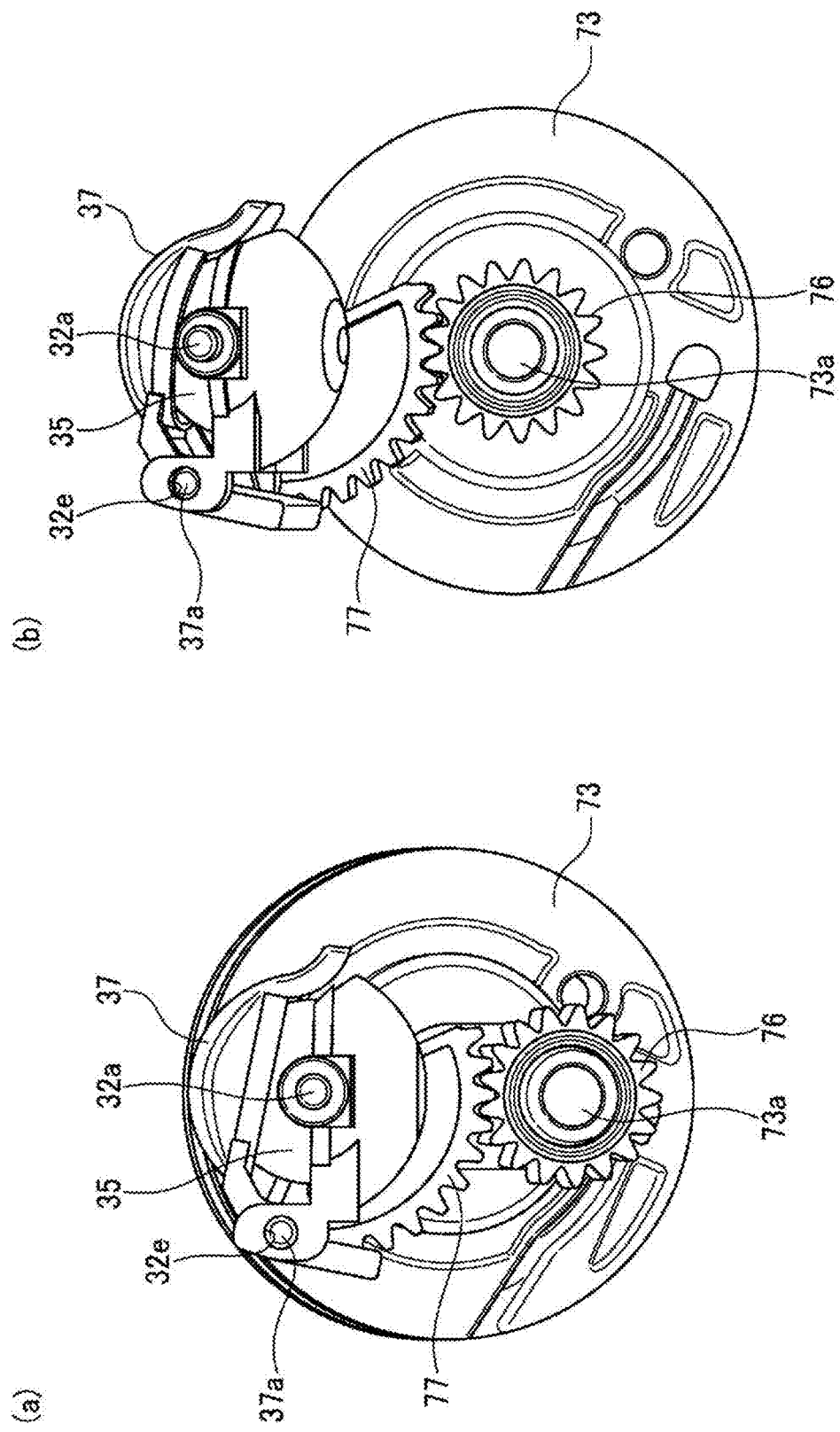
FIG. 5(a) is a perspective view as viewed from direction V in FIG. 4, and (b) is a perspective view as viewed from direction V in FIG. 4.

More specifically, for the present embodiment, when the cable winding radius of the cable winding groove 144 of the cam member 140 is twice the cable winding radius of the cable winding groove 73b of the pulley 73, the gear ratio between the drive gear 76 and the driven gear 77 is 2. For example, as illustrated in FIG. 5, the drive gear 76 has 17 teeth, and of the full gear circumference with 34 teeth of the driven gear 77, the teeth part required to pivot the sensor housing 32 is formed in a substantially fan shape.

In addition, with the present embodiment, as illustrated in FIG. 4, FIG. 5(a), and FIG. 5(b), the rotation shaft L2 of the pulley 73 and the pivot shaft L1 of the sensor housing 32 intersect at a predetermined angle θ in the same plane. Therefore, when the rotation of the pulley 73 is transferred to the sensor housing 32, the drive gear 76 and the driven gear 77 are mutually engaged in a state where an orbital plane of rotation K1 of the drive gear 76 and an orbital plane of rotation K2 of the driven gear 77 intersect at a predetermined angle θ. In other words, the gear teeth of the drive gear 76 and the driven gear 77 can be engaged without any backlash while keeping the predetermined angle θ.

Therefore, when the pulley 73 rotates in the same direction as the recline angle of the seatback 16, the inertial body supporting surface 33 of the sensor housing 32 rotates to the same rotation angle as the recline angle of the seatback 16 in the opposite direction of the recline direction of the seatback 16 due to engagement of the drive gear 76 and the driven gear 77.

In this manner, even when the rotation shaft L2 of the pulley 73 and the pivot shaft L1 of the sensor housing 32 intersect while maintaining a predetermined angle θ on the same plane, the inclination controlling mechanism 70 of the present embodiment is configured to transfer the rotation of the pulley 73 to the sensor housing 32 through the drive gear 76 and the driven gear 77 in order to cause the sensor housing 32 to pivot. Thereby, the inclination controlling mechanism 70 orients the sensor reference line S1 of the acceleration sensor 30 (a line perpendicular to the sensor reference plane which passes through the center of the ball 35 in a neutral position) in the vertical direction with regards to the front-back direction of the vehicle and maintains the inertial body supporting surface 33 (perpendicular sensor reference plane to the sensor reference line S1) to be substantially horizontal.

The seatbelt retractor 11 with the above configuration is mounted on the seatback 16 with a different standard mounting inclination for each model and seat specification, for example, with an incline of θ=15° in the width direction of the vehicle (the left-right direction of the seat) and an approximately 15° incline to the rear of the vehicle. The seatbelt retractor 11 can be mounted at different tilt directions and angles in the vehicle width direction depending on the vehicle model and seat specifications by tilting the spindle 22 in the vehicle width direction at the same direction as the pulling direction of the seatbelt 19, thereby achieving smooth pulling out of the seatbelt 19.

In addition, as illustrated in FIG. 4, there are two mounting inclinations, one for mounting the retractor frame 21 with a tilt at the predetermined angle θ (=15°) to the right side, tilting the pulley 73 of the inclination controlling mechanism 70 to the right side by the predetermined angle θ. Conversely, while not illustrated, the other mounting inclination is to mount the retractor frame 21 at a tilt of the predetermined angle θ to the left side, thus tilting the pulley 73 of the inclination controlling mechanism 70 to the left side by the predetermined angle θ.

The mounting inclinations of the present embodiment assume that the rotation shaft L2 of the pulley 73 has an incline at the predetermined angle θ to the horizontal direction along the left-right direction of the vehicle. In other words, different sensor covers 31 are prepared for each type of seat on the left and right, such that even if the rotation shaft L2 of the pulley 73 is reclined from horizontal, the pivot shaft L1 of the sensor housing 32 of the acceleration sensor 30 is kept substantially horizontal and that the sensor reference line S1 of the acceleration sensor 30 is oriented in the vertical direction.

Note that the mounting angle of the retractor frame 21 can be arbitrarily set, and the pivot shaft L1 of the sensor housing 32 can always be maintained substantially horizontal by mounting the acceleration sensor 30 to the retractor frame 21 using a dedicated sensor cover 31 prepared for each set mounting angle. At this time, the rotation of the pulley 73 can be reasonably transferred to the sensor housing 32 through the drive gear 76 and the driven gear 77 when the pivot shaft L1 of the sensor housing 32 and the rotation shaft L2 of the pulley 73 are on the same straight line, or intersect at an angle (in other words, when the orbital plane of rotation of the drive gear 76 and the orbital plane of rotation of the driven gear 77 are mutually parallel or are mutually non-parallel).

In addition, regarding the retractor frame 21 for the right seat in comparison with the retractor frame 21 for the left seat, the sensor cover 31 must be made larger in the left-right direction of the vehicle in order to engage the driven gear 77 and the drive gear 76 mounted on the boss part 32b side between the pulley 73 and the sensor housing 32, thus making the retractor 11 itself larger. As a result, as illustrated in FIG. 2(a), with regard to the retractor frame 21 for the left seat, the driven gear 77 is mounted on the side of a boss part 32a separated from the pulley 73, and the length of the shaft part 73a of the pulley 73 is adjusted, in order to engage the drive gear 76 with the driven gear 77.

Therefore, the recline angle of the seatback 16 and the rotation angle of the sensor housing 32 can be accurately synchronized, the inertial body supporting surface 33 which is the sensor reference plane can be accurately maintained horizontally, and the accuracy of the acceleration sensor 30 can be enhanced, by also incorporating the pulley 73 for the right seat and the left seat into the inclination controlling mechanism 70 of the present embodiment.

Next, the cable advancing/retracting mechanism 100 is described in detail.

Figure 7:
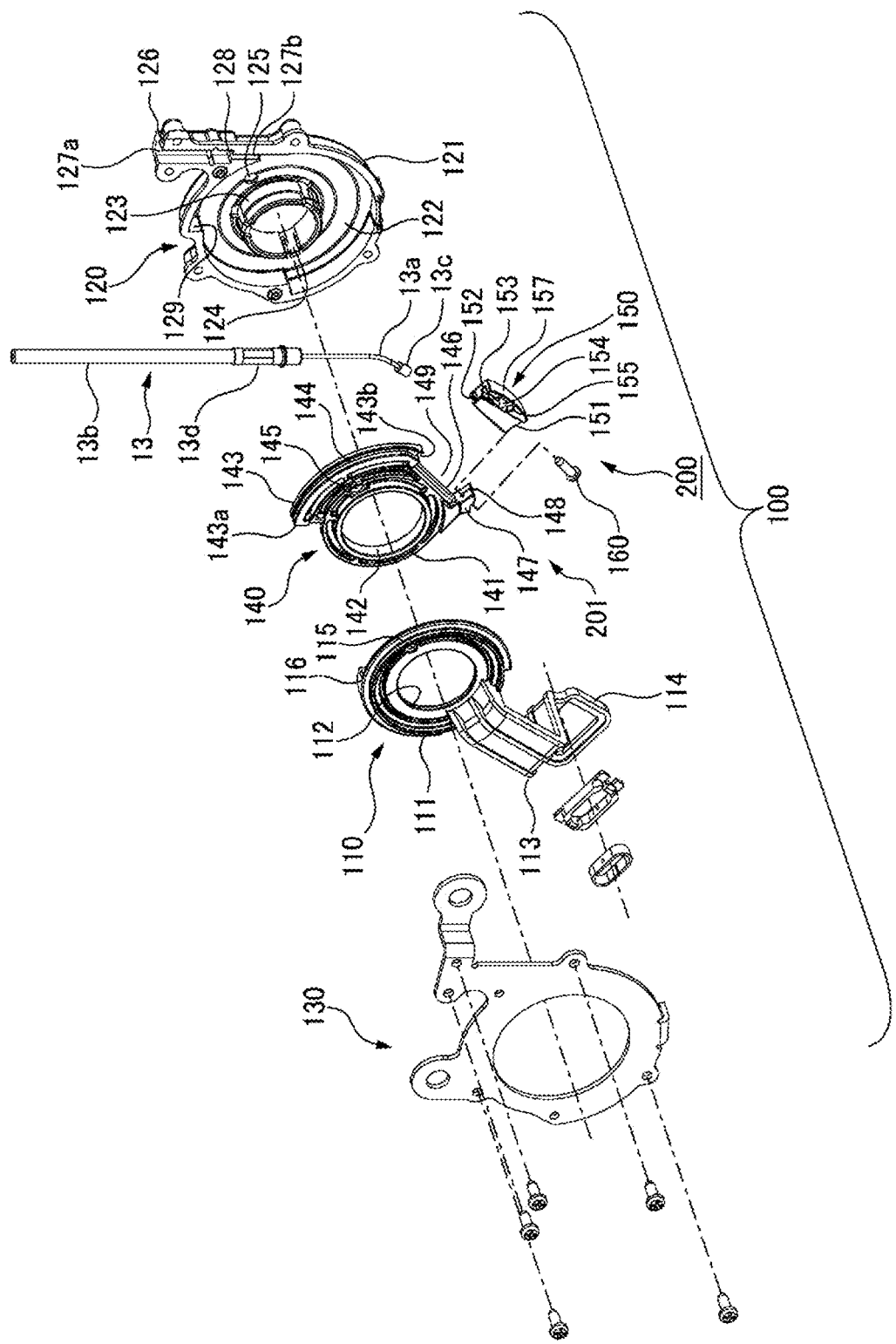
FIG. 7 is an exploded perspective view illustrating a configuration of a cable advancing/retracting mechanism.
Figure 8:
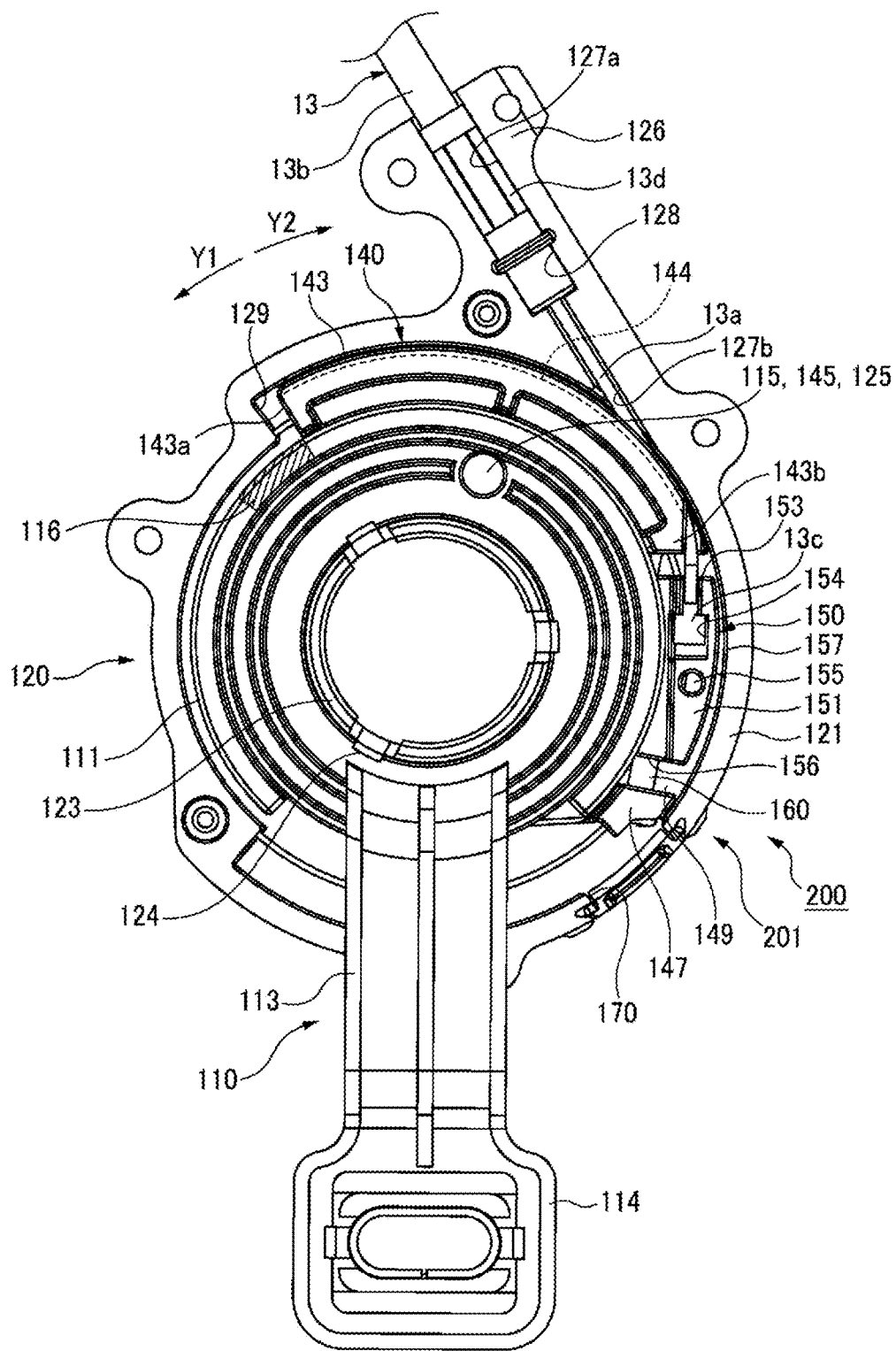
FIG. 8 is a front surface view illustrating an internal configuration of a cable advancing/retracting mechanism.

As illustrated in FIG. 7 and FIG. 8, the cable advancing/retracting mechanism 100 includes a lever member 110, a casing member 120, a cover 130 that covers the opening surface of the casing member 120, a cam member 140 rotatably housed in the casing member 120, and a cable length adjusting mechanism 200 including a cable adjuster 150 and cable adjuster moving means 201.

The lever member 110 includes an arm 113 that extends in the radial direction of rotation of the casing member 120, a ring part 111 with a round hole 112 concentric to the center of rotation of the seatback 16, integrated to the base end part of the arm 113, and a stopper protrusion 116 that protrudes in an axial direction towards the side surface of the ring part 111. The lever member 110 is secured to the seat cushion 17 by a tip end part 114 of the arm 113.

The casing member 120 forms an annular outer circumferential wall 121 which covers the periphery of the cam member 140, and a cylindrical boss part 123 by an annular recessed part 122 on the inner side of the outer circumferential wall 121. Furthermore, a cable guiding part 126 that protrudes outside a portion of the outer wall 121 is also provided. The cable guiding part 126 is provided with cable guiding grooves 127a and 127b that extend in a tangential direction of the ring-shaped recessed part 122. The outer cable guiding groove 127a is formed to be large enough (large groove width) to insert the end of the exterior tube 13b of the cable unit 13 and the terminal members 13d mounted on the end thereof. The inner cable guiding groove 127b is formed to be large enough (small groove width) to barely insert the cable 13a that is pulled out from the end of the exterior tube 13b. In addition, the outer cable guiding groove 127a is provided with an exterior tube terminal securing part 128 that positions and secures the terminal member 13d of the exterior tube 13b.

The inner circumference of the outer circumferential wall 121 of the casing member 120 is provided with a butting step part 129 that rotates the cam member 140 in the same direction by abutting with one end 143a of the cam part 143 of the cam member 140 described below, when the casing member 120 is rotated in the direction of arrow Y2 in FIG. 8.

The casing member 120 is secured to the seatback 16 together with the cover 130 while the boss part 123 is positioned on the joining part 18 (see FIG. 1) which rotatably joins the seat cushion 17 and the seatback 16. In addition, by inserting the boss part 123 of the casing member 120 in the round hole 112 of the lever member 110, the casing member 120 is rotatably joined to the lever member 110 around the boss part 123 concentric to the center of rotation of the seatback 16, and rotates in conjunction with the recline of the seatback 16.

The cam member 140 is rotatably provided on the lever member 110 and the casing member 120 concentric to the center of rotation of the seatback 16, and causes the cable 13a to advance or retract based on the recline angle of the seatback 16, by winding or pulling out the cable 13a based on the rotation. In addition, when the recline angle of the seatback 16 is within a predetermined range (a range applicable to the function of the acceleration sensor 30), the cam member 140 is prevented from moving when abutting with the stopper protrusion 116 of the lever member 110 as described below, when the casing member 120 rotates in conjunction with the recline of the seatback 16.

The cam member 140 has a round hole 142 in the center of a ring part 141 and a fan-shaped cam part 143 on a portion of the outer circumferential portion of the ring part 141 in the circumferential direction, and the cable winding groove 144 is formed on the outer circumferential surface of the cam part 143 along an arc concentric to the center of rotation of the cam member 140. The cam member 140 is housed in an annular recessed part 122 of the casing member 120, by rotatably inserting the cam member 140 in the boss part 123 of the casing member 120.

One end 143a in the circumferential direction of the fan-shaped cam part 143 is a portion that abuts with the stopper protrusion 116 of the lever member 110. Rotation of the cam member 140 in the direction of the arrow Y1 in FIG. 8 can be stopped because one end 143a abuts with the stopper protrusion 116.

Note that a flexible tab 124 is provided on the boss part 123 of the casing member 120 to prevent the ring part 111 of the lever member 110 or the ring part 141 of the cam member 140 from slipping after being inserted. In addition, the lever member 110, cam member 140, and casing member 120 have positioning holes 115, 145, and 125 which penetrate through the respective three members 110, 140, and 120, with the seatback 16 in the standard position, Furthermore, an adjuster housing recessed part 149 adjacent to a second end 143b of the fan-shaped cam part 143 is provided on one portion in the circumferential direction of the ring part 141 of the cam member 140. A cable adjuster 150 that forms the cable length adjusting mechanism 200 is housed in the adjuster housing recessed part 149. The cable adjuster 150 secures the terminal part of the base end (lower end) side of the cable 13a of which the tip end (upper end) is wound on the pulley 73 of the inclination controlling mechanism 70 (see FIG. 4) to the cam member 140. In addition, the cable adjuster 150 pulls on the cable 13a and adjusts the length of the cable 13a such that there is no slack.

First, the cable adjuster 150 is provided with an adjuster body 151, which is a small piece with a substantially rectangular shape. The adjuster body 151 is slidably mounted on the cam member 140 in a straight line in a tangential direction to a circle concentric to the center of rotation of the cam member 140 (center of rotation of the seatback 16). The side surface of the adjuster body 151 is provided with a C-shaped guide rail 152 which fits on a guide rail with a T-shaped cross section 146 formed on the base of the adjuster housing recessed part 149 of the cam member 140 in order to guide the sliding operation. The guide rail with a T-shaped cross section 146 and the C-shaped guide rail 152 are fitted using the elasticity of a resin material, which is the molding material, and guides the cable adjuster 150 to slide in a tangential direction. Note that the guide rail with a T-shaped cross section 146 can be provided on the side of the adjuster body 151, and the C-shaped guide rail 152 can be provided on the side of the cam member 140. In addition, the adjuster body 151 can be slid linearly, tilted in a direction tangential to the circle, or can also be slid linearly in a direction not tangential to the circle.

Furthermore, a cable end securing part 154 that secures the end part of the cable 13a by housing the end block 13c mounted on the end of the cable 13a that is wrapped around the cable winding groove 144 is provided on one end side in the sliding direction of the adjuster body 151 (closer to the other end 143b of the cam part 143). This cable end securing part 154 is formed by a recessed part, and is provided on the far end of a cable guiding groove 153 which houses the cable 13a. Note that a portion of the cable 13a near the terminal that was pulled-out from the end part of the exterior tube 13b is wrapped around the cable winding groove 144 of the cam part 143 of the cam member 140 for a maximum of approximately one-fourth of a rotation.

In addition, the cable adjuster moving means 201 which adjusts the length of the cable 13a pulled-out from the end part of the exterior tube 13b by moving the cable adjuster 150 is provided on the other end of the sliding direction of the adjuster body 151 (farther from the other end 143b of the cam part 143).

The cable adjuster moving means 201 includes a screw receiving wall 147 formed on the end part of the adjuster housing recessed part 149 of the cam member 140, a screw insertion hole 148 formed to penetrate the screw receiving wall 147, a screw hole 156 formed on the end surface in the sliding direction of the cable adjuster 150 (the other end surface in the sliding direction of the adjuster body 151), and adjusting screw 160 screwed into the screw hole 156 of the cable adjuster 150, of which the tip of the screw shaft passes through the screw insertion hole 148 and the head part of the screw is stopped by the screw receiving wall 147. The cable adjuster moving means 201 can position the cable adjuster 150 in an arbitrary position in the sliding direction using the adjusting screw 160 by turning the adjusting screw 160.

In addition, an outer surface 157 of the adjuster body 151 of the cable adjuster 150 is formed as an arcuate surface such that as far as possible, there is no interference with the outer circumferential wall 121 of the casing member 120, so that the sliding range of the cable adjuster 150 can be increased when the cable adjuster 150 slides. In addition, an insertion hole 155 is pierced in the board thickness direction at a position near the outer surface 157 on the opposite side as the guide rail 152 of the adjuster body 151, in order to insert a tool pin in the cable adjuster 150, not illustrated in the diagram.

Note that the outer circumferential wall 121 of the casing member 120 is provided with a servicing window 170 with an opening and closing lid, which allows for an operation of turning the adjusting screw 160 from the outside in an assembled state using a screw driver. In addition, the cover 130 is screwed onto the casing member 120 to cover the opening surface of the casing member 120 after the cam member 140 and the ring part 111 of the lever member 110 are housed in the casing member 120.

Figure 9:
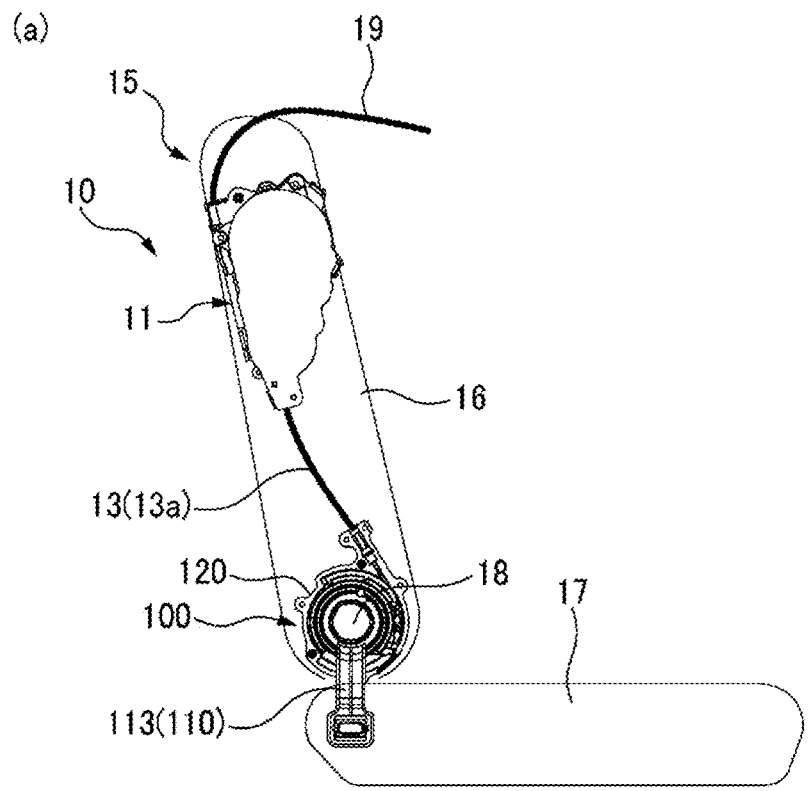
FIG. 9(a) is a side surface view illustrating a condition of the seatbelt retractor and cable advancing/retracting mechanism when the seatback is in a standard condition reclined back 15°, and (b) is a front surface view illustrating an internal condition of the cable advancing/retracting mechanism at this time.
Figure 9:
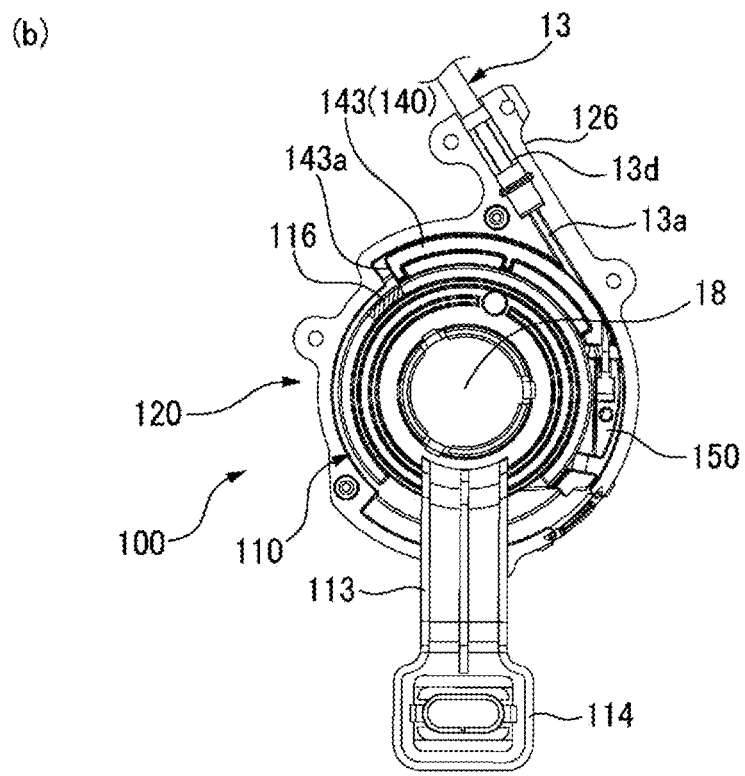
Figure 10:
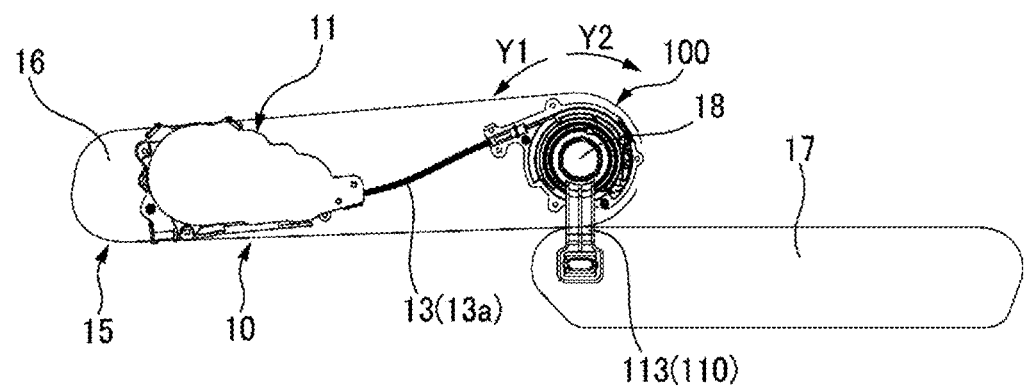
FIG. 10(a) is a side surface view illustrating a condition of the seatbelt retractor and cable advancing/retracting mechanism when the seatback is in a condition reclined back 95°, and (b) is a front surface view illustrating an internal condition of the cable advancing/retracting mechanism at this time.
Figure 10:
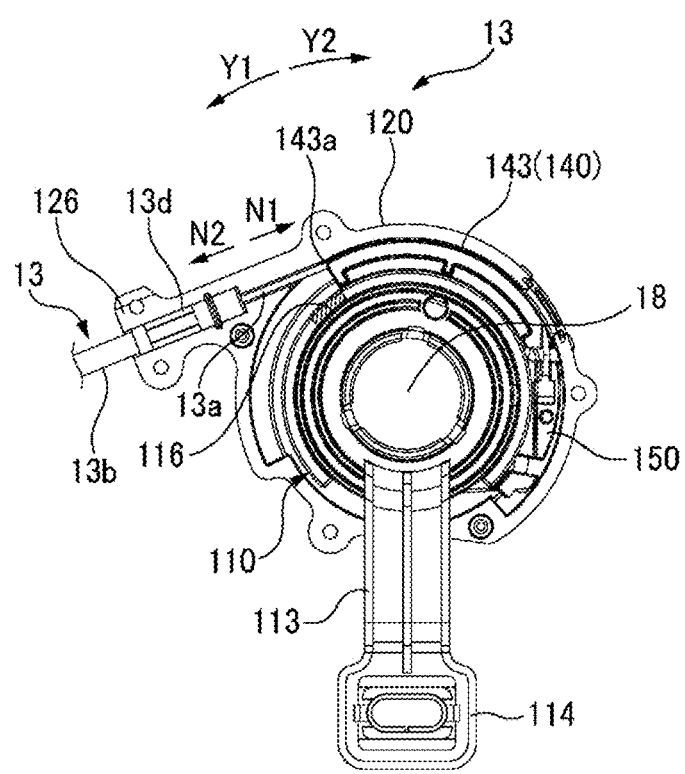
Figure 11:
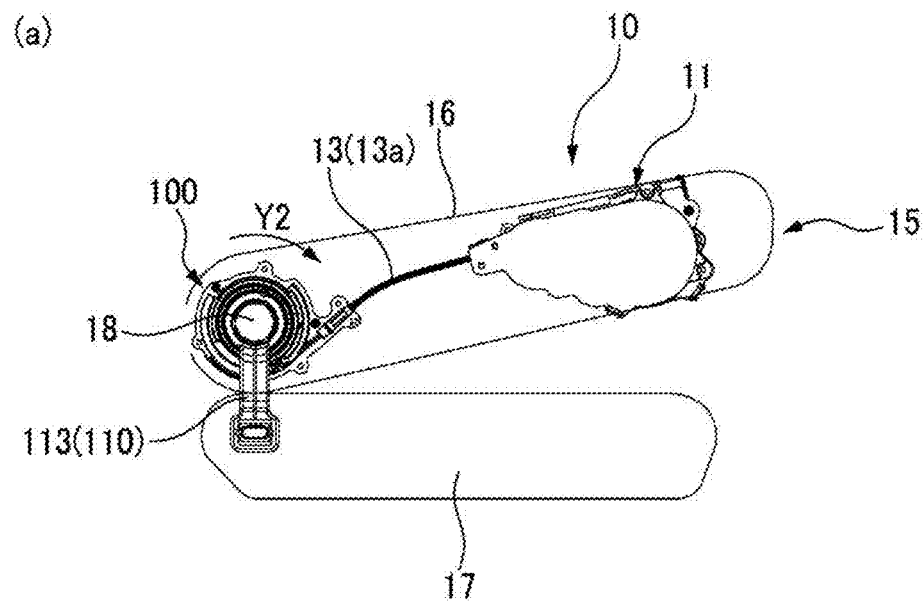
FIG. 11(a) is a side surface view illustrating a condition of the seatbelt retractor and cable advancing/retracting mechanism when the seatback is in a condition tilted forward 75°, and (b) is a front surface view illustrating an internal condition of the cable advancing/retracting mechanism at this time.
Figure 11:
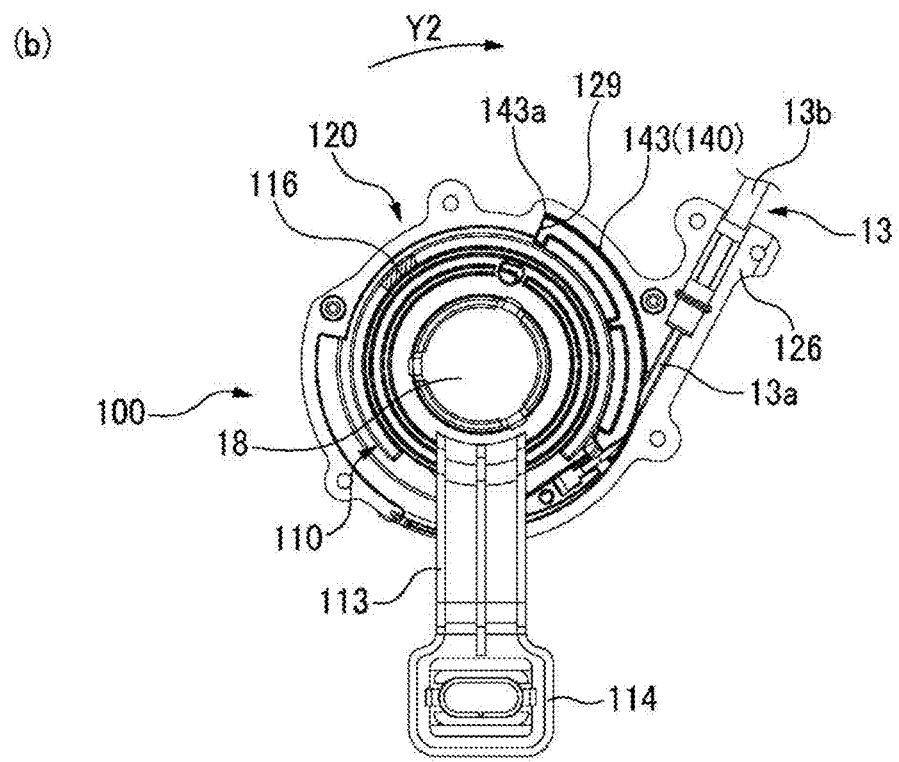

A description of the operation where the cable advancing/retracting mechanism 100 advances/retracts the cable 13a. FIGS. 9 to 11 are diagrams illustrating the state of the seatbelt retractor and the cable advancing/retracting mechanism for each recline angle of the seatback. FIG. 9 illustrates the standard inclination where the seatback is reclined back by 15°, FIG. 10 illustrates a condition where the seatback is reclined back by 95°, and FIG. 11 illustrates a condition where the seatback is tilted forward by 75°.

The cable advancing/retracting mechanism 100 can advance/retract the cable 13a to a length corresponding to the recline angle of the seatback 16 when the seatback 16 is reclined. For example, if the seatback 16 is reclined from the standard inclination illustrated in FIG. 9 to the position illustrated in FIG. 10 in the direction of arrow Y1, the stopper protrusion 116 of the lever member 110 abuts with the end 143a of the cam part 143 of the cam member 140, stopping the cam member 140 from moving. However, as the casing member 120 rotates with the seatback 16, the exterior tube 13b of the cable 13a moves with the casing member 120. Thereby, as the end of the cable 13a is pulled-out from the exterior tube 13b, a pull-in operation is applied to the cable 13a in the direction of arrow N1 (corresponding to a winding operation in the cable winding groove 144 of the cam part 143), which is transferred to the inclination controlling mechanism 70.

In addition, conversely, if the seatback 16 is returned from the position illustrated in FIG. 10 to the position illustrated in FIG. 9, the casing member 120 rotates in the opposite direction (in the direction of arrow Y2) and the exterior tube 13b is returned to the end side of the cable 13a. Therefore, the cable 13a which was pulled by the torsion spring 75 of the inclination controlling mechanism 70 is returned to the inside of the exterior tube 13b, a pushing operation is applied to the cable 13a in the direction of arrow N2 (corresponding to a pull-out operation from the perspective of the cable winding groove 144 of the cam part 143), which is transferred to the inclination controlling mechanism 70.

Note that if the seatback 16 is folded by rotating in the direction of arrow Y2 from the position illustrated in FIG. 9 to the position illustrated in FIG. 11, the casing member 120 rotates with the seatback 16 and the cam member 140 also rotates with the casing member 120 after the butting step part 129 of the casing member 120 abuts with the end 143a of the cam part 143 of the cam member 140, such that a pull-in operation is not applied to the exterior tube 13b of the cable 13a. However, an occupant cannot sit on the seat cushion 17 folded in this manner and the sensor housing 32 will not cause any hindrance by not maintaining a horizontal state.

Next, the function of the present embodiment is described.

When the reclining angle of the seatback 16 is adjusted, the cable 13a is advanced/retracted by a length corresponding to the length of the reclining angle. The pulley 73 of the inclination controlling mechanism 70 rotates according to the advancing/retracting of the cable 13a. Herein, the configuration is such that if the cable winding radius of the cable winding part of the cam member 140 is $\alpha$ times the cable winding radius of the cable winding part of the pulley 73, the gear ratio of the drive gear 76 and the driven gear 77 will be $\alpha$. Therefore, when the pulley 73 rotates in the same direction as the recline direction of the seatback 16, the driven gear 77 rotates in the opposite direction, and this rotation is transferred to the sensor housing 32, the sensor housing 32 rotates in the opposite direction of the seatback 16 at the same angle as the recline angle, and the inertial body supporting surface 33 of the sensor housing 32 is maintained substantially horizontal.

If acceleration in the horizontal direction larger than the predetermined value is applied on the accelerometer 30 due to a vehicle collision or the like, the ball 35, which is the inertial body placed on the inertial body supporting surface 33, is displaced from the neutral position. Thereby, the second sensor lever 37 rotates, and that rotation is transferred to the first sensor lever 36 so that the first sensor lever 36 rotates, causing the upper tab part 36b to engage with the engaging tab 25a of the steering wheel 25, restricting rotation of the steering wheel 25, and restraining the occupant by preventing the seatbelt 19 from being pulled out.

As the sensor housing 32 is always maintained in a substantially horizontal state regarding the tilt in the front-back direction of the vehicle, the accelerometer 30 reasonably detects any gentle acceleration in the vehicle movement direction and any transition from a gentle deceleration to a rapid deceleration, immediately locking the seatbelt 19 from being pulled out, without causing a delay in locking the seatbelt 19.

As described above, with the seatbelt device 10 of the present invention, the inclination controlling mechanism 70 is provided with: a pulley 73 that converts the advancing/retracting movement of the cable 13a of the cable advancing/retracting mechanism 100 to a rotational movement; a drive gear 76 mounted on a rotation shaft L2 of the pulley 73 and synchronized with the rotation of the pulley 73; and a driven gear 77 mounted on the pivot shaft L1 of the sensor housing 32 so as to move in conjunction with the rotation of the sensor housing 32. The drive gear 76 and driven gear 77 engage with each other in a condition where the rotational orbiting surface of the drive gear 76 and rotational orbiting surface of the driven gear 77 intersect at a predetermined angle. As a result, the inertial body supporting surface 33 serving as a sensor reference plane can be accurately maintained horizontally even at an arbitrary seatback recline angle, and thus the accuracy of the accelerometer 30 can be improved.

In addition, with the present embodiment, the cam member 140 is provided on the cable advancing/retracting mechanism 100 so as to advance/retract the cable 13a by a distance based on the recline angle of the seatback 16 by winding or pulling the cable 13a based on rotation. The pulley 73 and each of the cable winding grooves 73b and 144 of the cam member 140 are round or arc-shaped. If the cable winding radius of the cable winding groove 144 of the cam member 140 is $\alpha$ times the cable winding radius of the cable winding groove 73b of the pulley 73, the gear ratio of the drive gear 76 and the driven gear 77 will be $\alpha$. Thereby, an increase in accuracy of the accelerometer 30 can be achieved. In addition, the size of the cable winding radius of the cam member 140 and the cable winding groove of the pulley 73 can be freely designed by adjusting the gear ratio between the drive gear 76 and the driven gear 77.

In addition, with the present embodiment, the driven gear 77 is fitted and secured in a non-round part 32b1 provided on a boss part 32b formed above the pivot shaft L1 of the sensor housing 32, and the pulley 73 extends along the rotation shaft L2 and has a shaft part 73a where the drive gear 76 is mounted such that the drive gear 76 engages at a position in the axial direction of the driven gear 77. Therefore, the position in the axial direction where the drive gear 76 and the driven gear 77 engage can be freely designed by appropriately setting the length of the shaft part 73a. Herewith, with the present embodiment, the sensor housing 32, sensor cover 31, pulley 73, and the like are made as different parts for the right seat and the left seat, but the remaining parts can be common, such that standardization of the components can be achieved even for seatbelt retractors with different mounting inclinations on the right seat and the left seat. As a result, component design and mold structure do not have to be complex, achieving a reduction in cost.

In addition, the sensor cover 31 is separately provided from the inclination controlling mechanism 70, the pivot shaft L1 of the sensor housing 32 is mounted in the horizontal direction with regard to the left-right direction of the seat 15, and the sensor cover 31 is formed such that the rotation shaft L2 of the pulley 73 and the pivot shaft L1 of the sensor housing 32 intersect at a predetermined angle. As a result, the inertial body supporting surface 33 serving as the sensor reference plane can be maintained horizontally even at an arbitrary recline angle of the seatback 16, such that acceleration can be reasonably detected.

Note that the present invention is not limited to the above embodiment, and can be modified, improved, and the like within reason. Furthermore, each of the components, shapes, dimensions, amount, positional location, and the like of the above embodiment are arbitrary and not restricted so long as the present invention is achieved.

In addition, with the embodiment described above, the rotation shaft L2 of the pulley 73 which serves as the rotation shaft of the drive gear 76 and the pivot shaft L1 of the sensor housing 32 which serves as the rotation shaft of the driven gear 77 are provided on the same plane. However, the rotation shaft L2 of the pulley 73 and the pivot shaft L1 of the sensor housing 32 can have a relationship with a twisted position not on the same plane.

Note that the present application is based on the Japanese Patent Application (Patent Application 2018-017716) submitted for application on Feb. 2, 2018, which is cited by reference in the present application.

EXPLANATION OF CODES

10: Seatbelt device
11: Seatbelt retractor
13a: Cable
13b: Exterior tube
13c: End block
15: Reclining type seat
16: Seatback
17: Seat cushion
18: Seatback and seat cushion joining part
19: Seatbelt
21: Retractor frame
22: Spindle
24: Locking mechanism
30: Acceleration sensor
31: Sensor cover
32: Sensor housing
33: Inertial body supporting surface (sensor reference plane)
35: Ball (inertial body)
36: First sensor lever (actuating member)
37: Second sensor lever (actuating member)
70: Inclination controlling mechanism
73: Pulley
73b: Cable winding groove (cable winding part)
76: Drive gear
77: Driven gear
100: Cable advancing/retracting mechanism
140: Cam member
144: Cable winding groove (cable winding part)
S1: Sensor reference line
L1: Pivot shaft
L2: Rotation shaft

The invention claimed is:

1. A seatbelt device, comprising:
a seatbelt retractor mounted on a seat back of a reclining seat and that winds up a seatbelt when necessary; and
a cable advancing/retracting mechanism disposed on a coupling part of the seat back and a seat cushion of the reclining seat, and having a cable for detecting a recline angle when the seat back reclines in a front-back direction of the seat and transmitting the recline angle to the seatbelt retractor, the cable advancing or retracting in a length direction of the cable at a distance corresponding to the recline angle of the seat back; wherein
the seatbelt retractor comprises:
a retractor frame secured to the seat back, inclining in a left-right direction of the seat with regard to a straight line extending in a vertical direction through a center of the seat back in the left-right direction;
a spindle supported by the retractor frame for winding the seatbelt;
an acceleration sensor mounted on the retractor frame and that detects acceleration in the front-back direction of the seat;
a locking mechanism that locks a pull-out operation of the seatbelt based on the acceleration in the front-back direction of the seat detected by the acceleration sensor; and
a inclination controlling mechanism that keeps a sensor reference plane of the acceleration sensor horizontal;
the acceleration sensor comprises:
a sensor cover secured to the retractor frame;
an inertial body that moves in the front-back direction of the seat when an acceleration that is greater than a predetermined value acts in the front-back direction of the seat;
a sensor housing having a pivot shaft along the left-right direction of the seat, that is maintained in the sensor cover, and having an inertial body supporting surface where the inertial body is mounted; and
an actuating member that actuates the locking mechanism to a locking side in conjunction with the inertial body moving in the front-back direction of the seat; the inclination controlling mechanism comprises:
a pulley that converts the advancing/retracting movement of the cable advancing/retracting mechanism into a rotational motion;
a drive gear provided around a rotation shaft of the pulley and synchronized with rotation of the pulley; and
a driven gear mounted around the pivot shaft of the sensor housing so as to move in conjunction with the rotation of the sensor housing; wherein
the rotation shaft of the pulley and pivot shaft of the sensor housing intersect at a predetermined angle such that the pivot shaft of the sensor housing is provided in a horizontal direction with regard to the left-right direction of the seat;

the inertial body supporting surface of the sensor housing is maintained in a horizontal condition by pivoting the sensor housing in the front-back direction even if the seat back is reclined in the front-back direction of the seat; and the drive gear and driven gear engage with each other in a condition where a rotational track surface of the drive gear and rotational track surface of the driven gear intersect at the predetermined angle.

2. The seat belt device according to claim 1, wherein a cam member that advances/retracts the cable by the distance based on the recline angle of the seat back by winding or pulling the cable based on rotation is provided in the cable advancing/retracting mechanism, cable winding parts of the pulley and cam member are circular or arc-shaped, and when the winding radius of the cable of the cable winding part of the cam member is α times the cable winding radius of the cable winding part of the pulley, the gear ratio between the drive gear and driven gear is α.

3. The seatbelt device according to claim 1, wherein the driven gear is formed in a substantially fan-like shape.

4. The seatbelt device according to claim 1, wherein the driven gear is fitted and secured in a non-circular portion provided on a boss part formed above the pivot shaft of the sensor housing, and the pulley extends along the rotation shaft, and has a shaft part where the driven gear is mounted such that the drive gear engages at a position in the axial direction of the driven gear.

5. The seatbelt device according to claim 1, wherein the sensor cover is separately provided from the inclination controlling mechanism, the pivot shaft of the sensor housing is mounted in the horizontal direction with regard to the left-right direction of the seat, and the sensor cover is formed such that the rotation shaft of the pulley and pivot shaft of the sensor housing intersect at the predetermined angle.

6. The seatbelt device according to claim 1, wherein the driven gear is mounted around the pivot shaft of the sensor housing on the pulley side with regard to the inertial body supporting surface.

7. The seatbelt device according to claim 1, wherein the driven gear is mounted around the pivot shaft of the sensor housing on a side separated from the pulley with regard to the inertial body supporting surface.

8. A seatbelt device, comprising: a seatbelt retractor mounted on a seat back of a reclining seat and that winds up a seatbelt when necessary; and a cable advancing/retracting mechanism disposed on a coupling part of the seat back and a seat cushion of the reclining seat, and having a cable for detecting a recline angle when the seat back reclines in the front-back direction of the seat and transmitting the recline angle to the seatbelt retractor, the cable advancing or retracting in a length direction of the cable at a distance corresponding to the recline angle of the seat back; wherein the seatbelt retractor comprises: a retractor frame secured to the seat back, inclining in a left-right direction of the seat with regard to a straight line extending in a vertical direction through a center of the seat back in the left-right direction; a spindle supported by the retractor frame for winding the seatbelt; an acceleration sensor mounted on the retractor frame and that detects acceleration in the front-back direction of the seat; a locking mechanism that locks a pull-out operation of the seatbelt based on the acceleration in the front-back direction of the seat detected by the acceleration sensor; and a inclination controlling mechanism that keeps a sensor reference plane of the acceleration sensor horizontal; the acceleration sensor comprises: a sensor cover secured to the retractor frame; an inertial body that moves in the front-back direction of the seat when an acceleration that is greater than a predetermined value acts in the front-back direction of the seat; a sensor housing having a pivot shaft along the left-right direction of the seat, that is maintained in the sensor cover, and having an inertial body supporting surface where the inertial body is mounted; and an actuating member that actuates the locking mechanism to a locking side in conjunction with the inertial body moving in the front-back direction of the seat; the inclination controlling mechanism comprises: a pulley that converts the advancing/retracting movement of the cable advancing/retracting mechanism into a rotational motion; a drive gear synchronized with rotation of the pulley; and a driven gear mounted around the pivot shaft of the sensor housing so as to move in conjunction with the rotation of the sensor housing; wherein the rotation shaft of the pulley and pivot shaft of the sensor housing intersect at a predetermined angle such that the pivot shaft of the sensor housing is provided in a horizontal direction with regard to the left-right direction of the seat; the inertial body supporting surface of the sensor housing is maintained in a horizontal condition by pivoting the sensor housing in the front-back direction even if the seat back is reclined in the front-back direction of the seat; and the drive gear and driven gear engage with each other in a condition where a rotational track surface of the drive gear and rotational track surface of the driven gear intersect at the predetermined angle.

9. The seat belt device according to claim 8, wherein a cam member that advances/retracts the cable by the distance based on the recline angle of the seat back by winding or pulling the cable based on rotation is provided in the cable advancing/retracting mechanism, cable winding parts of the pulley and cam member are circular or arc-shaped, and when the winding radius of the cable of the cable winding part of the cam member is a times the cable winding radius of the cable winding part of the pulley, the gear ratio between the drive gear and driven gear is a.

10. The seatbelt device according to claim 8, wherein the driven gear is formed in a substantially fan-like shape.

11. The seatbelt device according to claim 8, wherein the driven gear is fitted and secured in a non-circular portion provided on a boss part formed above the pivot shaft of the sensor housing, and the pulley extends along the rotation shaft, and has a shaft part where the driven gear is mounted such that the drive gear engages at a position in the axial direction of the driven gear.

12. The seatbelt device according to claim 1, wherein the sensor cover is separately provided from the inclination controlling mechanism, the pivot shaft of the sensor housing is mounted in the horizontal direction with regard to the left-right direction of the seat, and the sensor cover is formed such that the rotation shaft of the pulley and pivot shaft of the sensor housing intersect at the predetermined angle.

13. The seatbelt device according to claim 8, wherein the driven gear is mounted around the pivot shaft of the sensor housing on the pulley side with regard to the inertial body supporting surface.

14. The seatbelt device according to claim 8, wherein the driven gear is mounted around the pivot shaft of the sensor housing on a side separated from the pulley with regard to the inertial body supporting surface.

15. A seatbelt retractor mounted on a seat back of a reclining seat that winds up a seatbelt when necessary, comprising:
   a retractor frame secured to the seat back, inclining in a left-right direction of the seat with regard to a straight line extending in a vertical direction through a center of the seat back in the left-right direction;
   a spindle supported by the retractor frame for winding the seatbelt;
   an acceleration sensor mounted on the retractor frame and that detects acceleration in a front-back direction of the seat;
   a locking mechanism that locks a pull-out operation of the seatbelt based on the acceleration in the front-back direction of the seat detected by the acceleration sensor; and
   an inclination controlling mechanism that keeps a sensor reference plane of the acceleration sensor horizontal;
   the acceleration sensor comprises:
   a sensor cover secured to the retractor frame;
   an inertial body that moves in the front-back direction of the seat when an acceleration that is greater than a predetermined value acts in the front-back direction of the seat;
   a sensor housing having a pivot shaft along the left-right direction of the seat, that is maintained in the sensor cover, and having an inertial body supporting surface where the inertial body is mounted; and
   an actuating member that actuates the locking mechanism to a locking side in conjunction with the inertial body moving in the front-back direction of the seat;
   the inclination controlling mechanism comprises:
   a pulley case arranged on a side plate of the retractor frame;
   a pulley stored in the pulley case and that is rotatable in accordance with a movement where the seat back reclines in the front-back direction of the seat;
   a drive gear mounted around a rotation shaft of the pulley and synchronized with a rotation of the pulley; and
   a driven gear is mounted around the pivot shaft of the sensor housing so as to move in conjunction with the rotation of the sensor housing; wherein
   the rotation shaft of the pulley and pivot shaft of the sensor housing intersect at a predetermined angle such that the pivot shaft of the sensor housing is mounted in a horizontal direction with regard to the left-right direction of the seat;
   the inertial body supporting surface of the sensor housing is maintained in a horizontal condition by pivoting the sensor housing in the front-back direction even if the seat back is reclined in the front-back direction of the seat; and
   the drive gear and driven gear engage with each other in a condition where a rotational track surface of the drive gear and rotational track surface of the driven gear intersect at the predetermined angle.

* * * * *